March 10, 1959 R. TOPEL 2,876,586
ATTACHMENT FOR AN AGRICULTURAL IMPLEMENT
Filed Sept. 18, 1957 2 Sheets-Sheet 1

INVENTOR.
Russell Topel
BY
Horton, Davis, Brewer & Brugman
Attorneys

March 10, 1959 R. TOPEL 2,876,586
ATTACHMENT FOR AN AGRICULTURAL IMPLEMENT
Filed Sept. 18, 1957 2 Sheets-Sheet 2
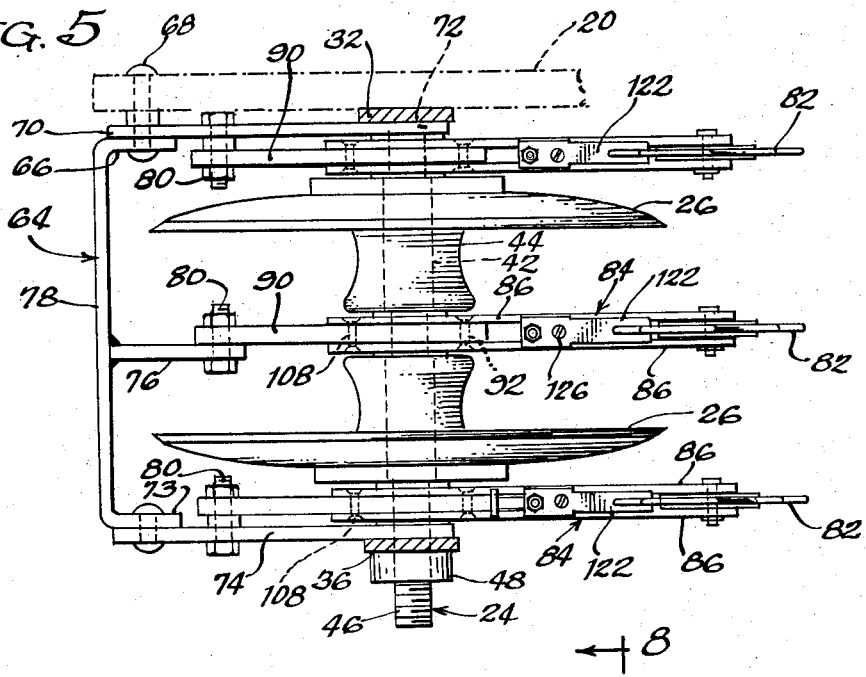
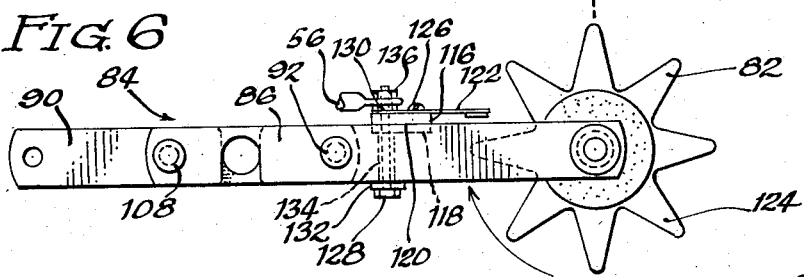
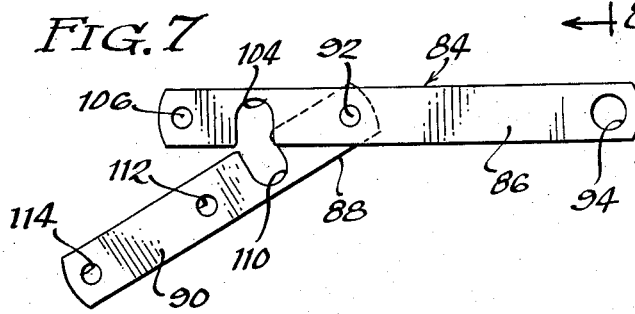
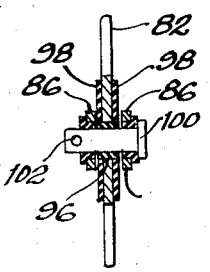
INVENTOR.
Russell Topel
BY
Horton, Davis, Brewer & Brugman
Attorneys 2,876,586

ATTACHMENT FOR AN AGRICULTURAL IMPLEMENT

Russell Topel, Peoria, Ill.

Application September 18, 1957, Serial No. 684,734

13 Claims. (Cl. 47—1.3)

My invention relates to an agricultural accessory or implement attachment for destroying vegetation and insects.

It has been established that the discharge of high voltage electricity into soil has the effect of killing harmful insects such as grubs, root worms and the like, and also killing vegetation in areas closely adjacent to the point of electrical discharge. In Patent No. 2,243,891, "Apparatus for Destroying Vegetation and Insects" issued June 3, 1941 to Topel and Burrows, apparatus is shown and described for the generation of appropriate electrical discharges and also for the application of such discharges to the ground.

My invention is directed to an improved mechanism for discharging the electrical impulses into the ground. The mechanism is self-contained and attachable directly to an agricultural implement, and the rate of discharge into the soil is proportioned to the velocity with which the tool is moved over or through the ground. My invention is directed to an assembly which is readily attachable to conventional agricultural implements with very minor modification thereof and is simple, sure in operation, and easily attached to or detached from the particular implement.

Other objects and advantages of my invention will be apparent from the following description and drawings, of which:

Fig. 5 is generally a plan of the disk or colter assembly taken substantially from line 5—5 of Fig. 1, looking in the direction of the arrows;

Fig. 6 is a side elevation of the electrical discharge application device;

Fig. 7 is a side elevation of the supporting shaft of the device, illustrating, however, a different relation of parts from Fig. 6; and, Fig. 8 is a section taken substantially along the line 8—8 of Fig. 6, looking in the direction of the arrows.

I have illustrated the embodiment of my invention in conjunction with a conventional dished agricultural disk which is an excellent carrier for my structure in that it is used before planting; more than almost any other agricultural tool it is inevitably used in planting; and it remains in continuous contact with the ground during working of the soil.

In the immediately described embodiment, I have shown paired disk elements serving as colters for a moldboard plow. By this showing, it will be clear as to how my invention can be applied to a plow, but it also will be evident therefrom as to how a disk harrow may carry and employ the structure of my invention.

Figure 1:
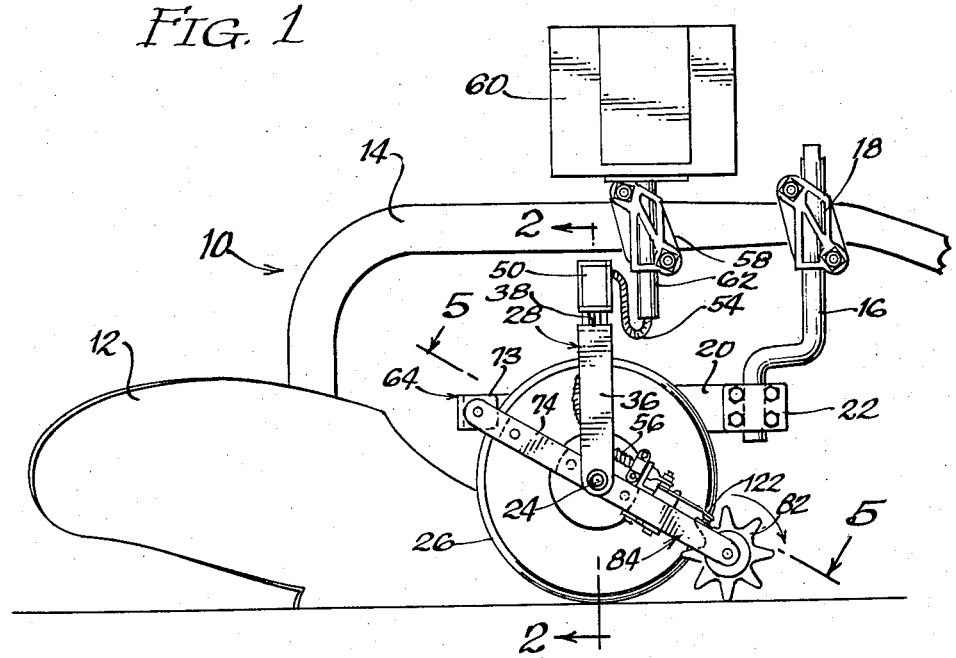
Fig. 1 is a side elevation of a moldboard plow, equipped with an embodiment of my invention.
Figure 2:
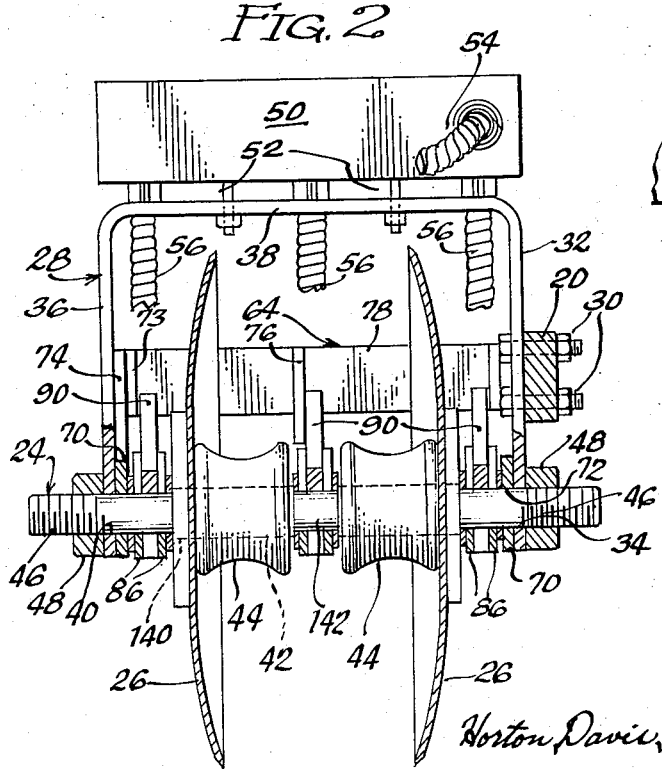
Fig. 2 is a section taken substantially along the line 2—2 of Fig. 1, looking in the direction of the arrows.

In Fig. 1 is illustrated generally a conventional moldboard plow 10 having a moldboard 12 and a beam 14. A colter stem 16 is secured to the beam 14 by clamp 18. A main support member 20 is clamped to the lower end of the colter stem 16 by clamp 22 and extends horizontally rearwardly and off to the left of the landside of the share.

At a point above the axle 24 of the disk colters 26, a U-shaped supporting frame 28 is secured in inverted vertical position as by bolts 30 extending through one leg 32 of the frame. That leg of the frame extends downwardly below bolts 30 and is bored as at 34 for the reception of the end of the axle 24. The other leg 36 of the frame extends downwardly from the frame base 38 to the right of the plow point and is bored at 40 to receive the other end of the disk axle 24. In order to insure rotation of the disks, the disk axle 24 is square in section in its central portion 42. The disks 26 have correspondingly square axle holes therein so that if either disk is in relation with the ground to be driven thereby, that disk will likewise drive the other disk so as to obtain the desired cutting and slicing action. Spacers 44 are provided also with square apertures therein to maintain the proper distance between the disks 26. The ends 46 of the axle are reduced to roundness in order to permit the axle to rotate within the bores 34, 40 in the legs of the supporting frame 28. The axle is secured between the legs 32, 36 of the frame by locked nuts 48.

The base 38 of frame 28 has a conductor box 50 mounted to the top side thereof by bolts 52. An armored cable 54 enters the side of the box, and within the box parallel connections are made to, in the illustrated embodiment, three armored cables 56 which extend through the bottom of the box 50 and through the base 38 of the frame 28 at approximately even intervals.

A clamp 58 similar to clamp 18 supports a case 60 by means of a tubular post 62 on top of the beam 14 of the plow, which contains batteries, coil, condenser and relay necessary to deliver the appropriate electrical charges to the soil. As these elements are well known in the art and do not constitute a part of my invention, they have not been illustrated. Cable 54 extends up through the tubular post 62 to be appropriately connected inside case 60.

An E-shaped shaft frame 64, formed by welding a tongue to the center of a U-shaped member is secured by one outside leg 66 to the rearward end of the main support member 20 as by a rivet 68. Mounted on that same rivet 68 is one end of a leg extension member 70. The other end of the leg extension member has a bore 72 therein, through which the axle end 46 extends. The opposite outside leg 73 of the E-shaped member 64 also has a leg extension member 74 similarly secured thereto, and at the other end to the axle end 46. The leg extension members 70 and 74 and the center tongue 76 have holes therein, equally spaced from the base 78 of E-shaped member 74 for the reception of bolts 80.

Referring particularly to Figs. 6, 7 and 8, the mechanism by which the electrical charges are delivered to the soil includes generally a star wheel 82 and a supporting shaft 84 therefor. The shaft consists of two parallel and identical arms 86 pivotally secured at a point adjacent their centers on opposite sides of one end 88 of a plate 90 by a rivet 92. One end of the arms 86 has relatively large diameter holes 94 formed therein. An insulating bushing 96 is contained in these holes to extend between the arms, and the star wheel 82 is rotatably mounted on the bushing 96 between arms 86. Insulating washers 98 separate the star wheel from the inside facing surfaces of the arms 86. A pin 100 suitably secured as by a cotter pin 102 extends through the bushing to support the assembly.

On the other side of rivet 92, the arms have a deep notch 104 therein opening downwardly and having a semi-circular bottom, and at the end of arms 86 beyond notch 104, holes 106 are bored and threaded for the reception of a machine screw 108.

Plate 90 has a notch 110 formed therein similar to notch 104 in arms 86 but opening upwardly. It is located on plate 90 an equal radial distance from rivet 92 as notch 104 in arms 86. Plate 90 also has a hole 112 therein aligning with holes 106 in arms 86. When plate 90 is pivoted or scissored on rivet 92 relative to arms 86, so as to place the plate in a line with the arms, machine screw 108 will latch the arms and plate in such aligned relation and notches 104 and 110 define a central aperture through the overlapping plate and arms.

Arm 90 has another bore 114 therein at its end remote from rivet 92 to receive bolts 80.

It will be noted that, by virtue of pin 100 by which the star wheel is secured to the arms 86, and rivet 92, the two arms are held in fixed spaced relation to one another. My device includes also an insulating block 116 having a central rib 118 on the underside thereof fitting closely between arms 86 and shoulders 120 on either side of rib 118 lying against the top edges of arms 86. A resilient brass finger 122 extends from one end of the block to lie in the path of rotation of the points 124 of the star wheel 82. The finger may be secured to the top of the block by screw 126. At the other end of the block, a hole is bored therethrough and through the other end of finger 122, and a bolt 128 passes transversely between arms 86 and through the hole in the block 116 and finger 122 to secure the block and finger to arms 86 as by nut 130. I provide an insulated washer 132 under the head of bolt 128 and an insulating sleeve 134 surrounding the shank of the bolt between arms 86 to insulate the bolt effectively from the shaft structure. The armored cables 56 may be in turn secured to the end of bolt 128 by a second nut 136 to make electrical contact with finger 122.

As illustrated, my device includes three ground-contacting elements or three shaft and star wheel assemblies.

Figure 3:
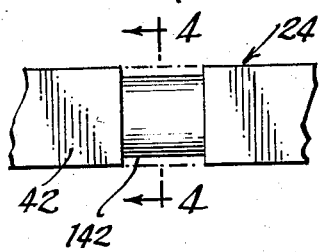
Fig. 3 is a partial enlarged elevation of the disk or colter shaft illustrating the area of attachment of the described embodiment of my electrical discharge application device.
Figure 4:
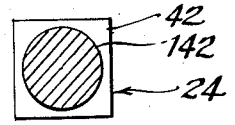
Fig. 4 is a section taken substantially along the line 4—4 of Fig. 3, looking in the direction of the arrows.

These assemblies are detachable from the supporting structure and have been described as detached. In order to make the connection of the shaft and star wheel assemblies to the supporting structure, the square central portion 42 of the disk axle 24 terminates on the outside of the disks 26 as at 140 so that the end portions of the axle in alignment with the outside legs 66, 73 of the E-shaped member 64 are round. Likewise, the very center 142 of the square central portion 42 of the disk axle is ground away to roundness as particularly illustrated in Figs. 3 and 4.

To attach the shaft and star wheel assemblies to the supporting structure therefor, the machine screw 108 is removed from its position of securing the plate 90 and arms 86 in alignment. The plate and arms are thus permitted to move pivotally with respect to each other so as to open the free ends of notches 104, 110 as illustrated particularly in Fig. 7. In this relative position as between the plate 90 and arms 86, the notch 104 of the arms may be placed over the round end portions of the axle 24 or the round center 142 thereof as the case may be, and the notch 110 in the plate 90 placed thereunder. The plate and arms are then moved relative to each other to the position illustrated in Fig 6, where the notches cooperatively overlap to provide a disk axle engaging aperture. The machine screw 108 is inserted to secure the arms and plate together in this position. Thereafter, the opposite rearward end of the plate 90 is secured to the leg extension members 70, 74 or the center tongue 76 respectively by the bolts 80. To complete the assembly, the cable 56 is secured to the bolt 128 by nut 136.

It will be appreciated from the foregoing description and from the drawings that by virtue of the main support member 20 extending rearwardly above the disk axle 24 and to the rear thereof, and by virtue of the attachment of the shaft 84 at its rearward end in the horizontal plane of the main support member and at its center to the disk axle 24 the shaft will incline downwardly so as to place the star wheel at ground level when the disk is at ground level and so make effective soil contact so as to deliver the desired charges into the soil.

It will also be appreciated that I have described but a single embodiment of my invention in relation to a particular type of agricultural implement. My invention is capable of taking many forms and of application to many other types of earth working machinery. I, therefore, desire that my invention be regarded as being limited only as set forth in the following claims:

What is claimed is:

1. An agricultural implement attachment for delivering electrical discharges to the soil, which comprises a rotatable conducting ground contacting element supported to be ground driven upon use of said implement, a flexible contact finger, means for delivering high voltage current to said finger and means on said rotatable element to make intermittent contact with said finger as said rotatable element is driven.

2. An agricultural implement attachment for delivering electrical discharges to the soil, which comprises a rotatable conducting ground contacting element, means supporting said element in a vertical plane in the direction of movement of said implement and at ground level as said implement is used, a flexible contact finger, means for delivering high voltage current to said finger, and means on said rotatable element to make intermittent contact with said finger as said rotatable element is driven.

3. An agricultural implement attachment for delivering electrical discharges to the soil, which comprises a rotatable conducting ground contacting element, means supporting said element in a vertical plane in the direction of movement of said implement and at ground level as said implement is used, a flexible contact finger supported by said supporting means adjacent said element, means for delivering high voltage current to said finger and means on said rotatable element to make intermittent contact with said finger as said rotatable element is driven.

4. An agricultural implement attachment for delivering electrical discharges to the soil, which comprises a conducting ground contacting star wheel rotatably supported to be ground driven upon use of said implement, a flexible contact finger, means supporting said contact finger to make intermittent contact with successive points of said star wheel as said star wheel rotates, and means for delivering high voltage current to said finger.

5. An agricultural implement attachment for delivering electrical discharges into the soil, said implement having a generally horizontal axle generally transverse to the line of movement of said implement, a supporting member spaced above and away from said axle in said line of movement of said implement and a source of high voltage electricity; comprising a shaft including a first member and a second member hinged together to overlap in a given angular relation, said members having aligned notches in opposite edges thereof in the overlapping portions, said notches defining an axle-embracing aperture when said members occupy said angular relation, detachable means for securing said members in said angular relation, means for securing a remote end of one of said members to said supporting member, soil contacting means on the remote end of the other of said members, and means intermittently connecting said soil contacting means to said electrical source.

6. An agricultural implement attachment for delivering electrical discharges into the soil, said implement having a generally horizontal axle generally transverse to the line of movement of said implement, a supporting member spaced above and away from said axle in said line of movement of said implement and a source of high voltage electricity; comprising a shaft including a first member and a second member hinged together to overlap substantially when said members occupy a straight angle, said members having aligned notches in opposite edges thereof in the overlapped portions, said notches defining an axle-embracing aperture when said members occupy said angular relation, detachable means for securing said members in said angular relation, means for securing a remote end of one of said members to said supporting member, soil contacting means on the remote end of the other of said members, and means intermittently connecting said soil contacting means to said electrical source.

7. An agricultural implement attachment for delivering electrical discharges into the soil, said implement having a generally horizontal axle generally transverse to the line of movement of said implement, a supporting member spaced above and away from said axle in said line of movement of said implement and a source of high voltage electricity; comprising a shaft including a first member and a second member hinged together in side-by-side relation at a point removed from the ends of one of said members to overlap substantially when said members occupy a straight angle, said notches defining an axle-embracing aperture when said members occupy said straight angle, detachable means for securing said members in said straight angle, means for securing a remote end of one of said members to said supporting member, soil contacting means on the remote end of the other of said members, and means intermittently connecting said soil contacting means to said electrical source.

8. An agricultural implement attachment for delivering electrical discharges into the soil, said implement having a generally horizontal axle generally transverse to the line of movement of said implement, a supporting member spaced above and away from said axle in said line of movement of said implement and a source of high voltage electrical discharges; comprising a shaft including a pair of parallel arms, a plate pivotally secured at one end between said arms and away from the ends thereof, said arms overlapping the sides of said plate substantially when said plate occupies a straight angle with respect to said arms, said arms and said plate having notches respectively in opposite edges thereof defining in said straight angle position of said plate and arms an axle-embracing aperture, detachable means securing said plate and arms in said straight angle position, means for securing the other end of said plate to said supporting member, soil contacting means secured between the remote ends of said arms in insulated relation thereto, and means intermittently connecting said soil contacting means to said electrical source.

9. An agricultural implement including a frame, a tool for working the ground, a generally horizontal axle generally transverse to the line of movement of said implement supporting said tool from said frame, a support member carried by said frame generally parallel to and above said axle, a source of high voltage electrical discharge, a demountable shaft comprising a first member and a second member hinged together in side-by-side relation at a point removed from the ends of one of said members to overlap substantially when said members occupy a straight angle, said members having aligned notches in opposite edges thereof in the overlapped portions totally enclosing a portion of said axle, means detachably securing said members in said straight angle relation, detachable means securing the remote end of one of said members to said supporting member, soil contacting means secured in insulated relation to the remote end of the other of said members, and means connecting said soil contacting means intermittently to said electrical source.

10. An agricultural implement including a frame, a pair of agricultural disks for working the ground, a generally horizontal square axle generally transverse to the line of movement of said implement supporting said disks for simultaneous rotation, means rotatably supporting said axle from said frame, said axle having a round portion thereon adjacent said disks, a demountable shaft comprising a first member and a second member hinged together in side-by-side relation at a point removed from the ends of one of said members to overlap substantially when said members occupy a straight angle, said members having aligned notches in opposite edges thereof in the overlapped portions totally enclosing a portion of said axle, means detachably securing said members in said straight angle relation, detachable means securing the remote end of one of said members to said supporting member, soil contacting means secured in insulated relation to the remote end of the other of said members, and means connecting said soil contacting means intermittently to a source of high voltage electricity.

11. In an agricultural implement, a gang of agricultural disks, a generally square axle mounting said disks for simultaneous rotation, means rotatably mounting said axle to said implement, said axle having round portions adjacent some of said disks, a support member secured to said implement generally parallel to and above said axle, demountable shafts secured at one end to said support member and embracing adjacent their centers said round portions of said axle, a star wheel mounted at the other ends of said shafts in insulated relation therefrom in ground contacting position as said implement is used in soil preparation in a vertical plane in the general direction of movement of said implement, and means for intermittently delivering a high voltage electrical discharge to said star wheels.

12. The combination as set forth in claim 11 wherein said shafts include a first member and a second member hinged together in side-by-side relation at a point removed from the ends of one of said members to overlap substantially when said members occupy a straight angle, said members having aligned notches in opposite edges thereof in the overlapped portions which together totally encompass said round portions of said axle.

13. The combination as set forth in claim 11 wherein said shafts include a first member and a second member hinged together in side-by-side relation at a point removed from the ends of one of said members to overlap substantially when said members occupy a straight angle, said members having aligned notches in opposite edges thereof in the overlapped portions which together totally encompass said round portions of said axle, a flexible finger mounted in insulated relation to the member carrying said star wheel, said finger lying in the path of movement of the points of said star wheel, a source of high voltage electricity, and means connecting said source of electricity to said finger.

References Cited in the file of this patent

UNITED STATES PATENTS

| | | |
|---|---|---|
| 2,588,561 | Opp | Mar. 11, 1952 |
| 2,632,285 | McCreight | Mar. 24, 1953 |